United States Patent [19]

Marom

[11] 4,159,418
[45] Jun. 26, 1979

[54] DELAY LINE ENCODER-DECODER

[75] Inventor: Emanuel Marom, Pacific Palisades, Calif.

[73] Assignee: Hughes Aircraft Company, Culver City, Calif.

[21] Appl. No.: 809,257

[22] Filed: Jun. 23, 1977

[51] Int. Cl.² .............................................. H04B 9/00
[52] U.S. Cl. ................................. 250/199; 250/227; 350/96.15; 333/141
[58] Field of Search ................ 250/199, 209, 211 J, 250/227; 358/901; 343/100 SA, 7.7, 7.6; 350/96.15; 333/29; 331/94.5 D, 94.5 M

[56] References Cited
U.S. PATENT DOCUMENTS

| 3,217,103 | 11/1965 | Lien | 358/135 |
| 4,028,702 | 6/1977 | Levine | 343/100 SA |

Primary Examiner—Robert L. Griffin
Assistant Examiner—Edward L. Coles
Attorney, Agent, or Firm—Martin E. Gerry; W. H. MacAllister

[57] ABSTRACT

Two multimode optical fibers connected mutually at several locations along their lengths can act as an encoding or decoding structure depending on which terminals are used for the input/output of the data. Two multicoupled lines have one input which acts as the matched filter for another input, thus enabling easy correlation of data. The performance of such a structure was simulated and the results are discussed.

17 Claims, 7 Drawing Figures

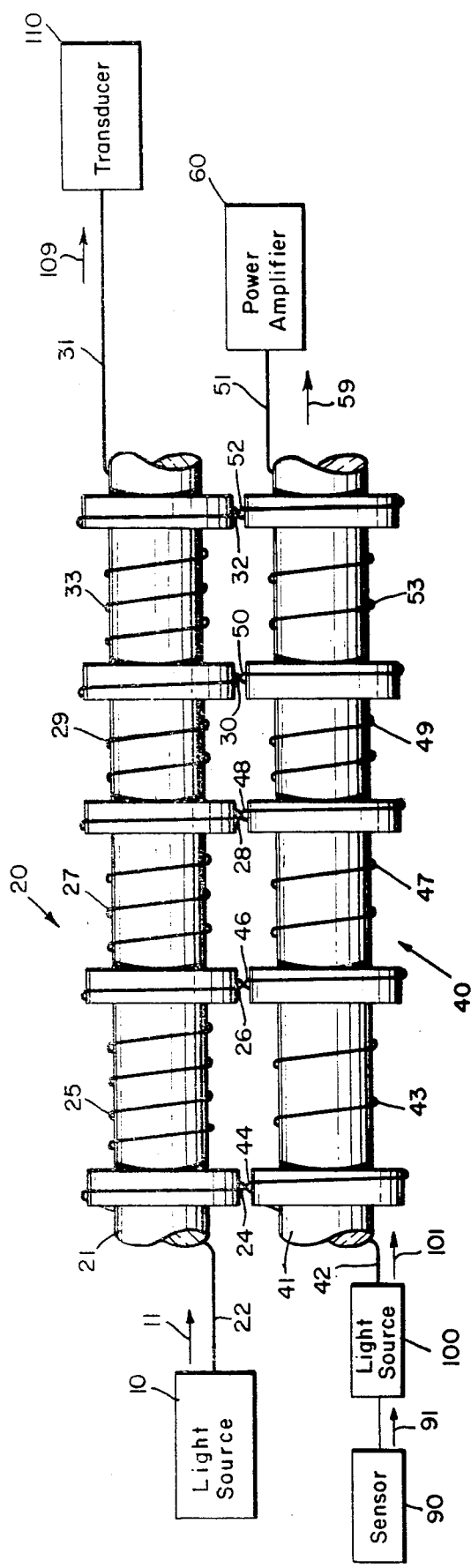
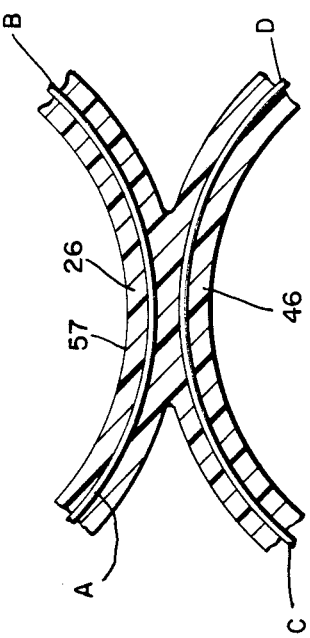

DELAY LINE ENCODER-DECODER

BACKGROUND OF THE INVENTION

This invention is in the field of signal processing systems, and particularly in the areas of wideband digital or analog signal processing means.

The prior art is exemplified by articles entitled "Fiber-Optic Delay Lines for Microwave Signal Processing," by Wilner and Van den Heuvel, Proceedings of IEEE, Vol. 64, No. 5, May 1976, pages 805-807; and "Fiber Optic Delay Lines for Pulse Coding," by Ohlhaber and Wilner, Electro-Optical Systems Design, Chicago, Ill., Feb. 1977, pages 33-35.

Such prior art shows encoding and decoding structures using optical fibers. However the prior art does not utilize the optical fibers connected serially nor does such prior art couple a plurality of the serially connected fibers to a similar structure to obtain coding and decoding of the signals.

SUMMARY OF THE INVENTION

Therefore an objective of the invention is to utilize optical fibers and couple such fibers at specified intervals between structural components of the system to obtain coding and decoding of signals.

A delay line encoder-decoder comprises the combination of a first optical structure having at least two optical fiber coils integral therewith, each region between the coils being at least one first coupling section, and a second optical structure having an optical fiber integral therewith, said optical fiber having a corresponding second section optically coupled to each of said first coupling section and contiguous thereto. The optical fiber includes at least one coil between any adjacent two of said second sections. The light source optically couples to a first of at least two optical fiber coils. The system includes a light source optically coupled to an input end of the optical fiber. A sensor is electrically connected to the input of the light source. The system includes a transducer optically coupled to a last of said at least one first coupling section. The system includes an amplifier optically coupled to the last of said coupling corresponding section. The system includes a light detector optically coupled to the last of said corresponding coupling section. The light detector includes an amplifier electrically connected to the output of the light detector.

Thus the system provides for a method of encoding and decoding electromagnetic energy, which provides for injecting light energy into a first optical delay line, transferring said energy to a second optical delay line, and passing the transferred energy into a first load thereby encoding said light energy.

The method also provides for passing the light energy from the first optical delay line into a second load.

The method additionally enables injecting the encoded light energy into the second optical delay line, transferring the encoded light energy to the first optical delay line, and passing the transferred energy from the first optical delay line into the second load thereby decoding said light energy.

BRIEF DESCRIPTION OF THE DRAWINGS

FIG. 1 is a schematic diagram partially in perspective of the delay line encoder-decoder according to the invention.

FIG. 2 is a partial schematic of an alternate load usable in the structure of FIG. 1.

FIG. 3 is a magnified view of one coupling section utilized in the structure of FIG. 1.

DETAILED DESCRIPTION

Theoretical Discussion

Figure 4:
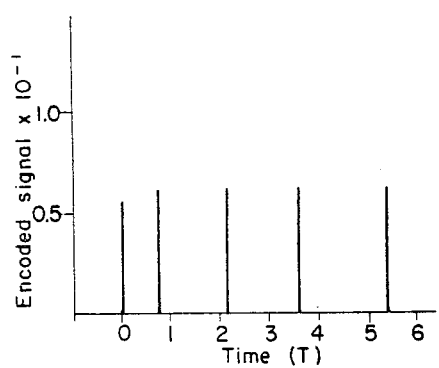
FIGS. 4-7 are encoded and decoded results obtained by computer simulation and experimentally verified.

New advances in manufacturing of low loss optical fibers and components for fiber communication systems make accessible the utilization of multi-delay line optical systems for signal processing. Optical fibers offer a medium with excellent crosstalk and ground loop immunity, capable of carrying securely large bandwidth information, in a small size and weight volume. Optical fibers maybe used for processing information. An explanation of an optical encoder-decoder system follows:

Throughout this specification lower case letters and their corresponding capitals are related to each other by the Fourier transform integral relation.

The theory of optimal filtering established that the detection of a signal s(t), is achieved optimally by a filter whose transfer function is given by $$S^*(\omega) = [\int s(t) e^{-i\omega t} dt]^*. \qquad (1)$$

This problem was treated widely in the literature. Very often the optimal filter had to be only approximately approached, since the exact solution required by Eq. (1) was not always realizable. it has been readily observed that the optimal filter provides the display of the autocorrelation function, since $$s(t) \circledast F^{-1}[S^*(\omega)] = s(t) \circledast S^*(-t) = \int s(\tau) s^*(t+\tau) d\tau, \qquad (2)$$

$\circledast$ being the convolution notation.

There is a class of problems amenable to the treatment of matched filters and realizable in real time. It involves a system composed of two coupled optical fiber delay lines as described in the next section. The time reversal necessary for the generation of the correlation function is obtained by addressing the fiber from complementary inputs. An optical delay line system for encoding/decoding information has been described in the IEEE and Electro-Optical Systems Design articles referred to in the background of the invention. However, the approach was to generate the coding sequence in parallel. This invention discloses a serial approach which has the virtue of providing its own matched filter by using complementary terminals.

Referring to FIGS. 1, 2 and 3, two optical fibers coupled mutually at several positions along their length are illustrated as exemplary. Assuming that N couplers have been introduced, the total length of the upper line is $$L_{1T} = \sum_{n=1}^{N-1} L_{1n} \qquad (3)$$

with a corresponding time delay $$\tau_{1T} = \frac{1}{v} \sum_{n=1}^{N-1} L_{1n}$$

where v is the velocity of propagation for the light in the fiber. Similarly one has in the lower delay line $$L_{2T} = \sum_{n=1}^{N-1} L_{2n} \quad (4)$$

and a total time delay $$\tau_{2T} = \frac{1}{v} \sum_{n=1}^{N-1} L_{2n}.$$

Herein $L_{11}$ is shown at 25, $L_{12}$ at 27 and $L_{13}$ at 29. $L_{21}$ is shown at 43, $L_{22}$ at 47 and $L_{23}$ at 49.

Herein the direction of signal flow represented by arrows 11, 91, 109, 101, and 59 also represent the signals per se hereinbelow discussed.

Assuming that the coupling coefficient ($\alpha_n$) at each coupling connection is much smaller than the transmission coefficient ($\beta_n$), an assumption that will be later proven to be required for optimal energy transfer, we can evaluate the impulse response at terminals 31 and 51. Thus for a pulsed input at 22[$i(t) = \delta(t)$] one gets at 31: $i(t) = (\prod_{k=1}^{N} \beta_k) \delta(t - \tau_{1T}) = A\delta(t - \tau_{1T})$ (5)

at 51: $i(t) = \sum_{n=1}^{N} a_n \delta(t - \tau_n)$ (6)

with $a_n = \left[\prod_{k=1}^{n-1} \beta_k\right] \alpha_n \left[\prod_{k=n+1}^{N} \beta_k\right] =$ (7)

$$\frac{\alpha_n}{\beta_n} \left[\prod_{k=1}^{N} \beta_k\right] = \frac{\alpha_n}{\beta_n} A$$

and $\tau_n = \frac{1}{v} \left\{ \sum_{q=1}^{n-1} L_{1q} + \sum_{p=n}^{N-1} L_{2p} \right\}$ (8)

Expression (6) describes a signal which is essentially an encoded version of the input signal.

Thus the task of recognition, or decoding, of the scrambled signal (Eq. 6) will require a filter, whose transfer function in the Fourier domain is prescribed by Eq. (1). The transfer function of the scrambler is $$I(\omega) = \sum_{n=1}^{N} a_n e^{-i\omega\tau_n}, \quad (9)$$

with $a_n$ real value coefficients (in multimode optical fibers the coupling and transmission coefficients are real). Thus the transfer function of the necessary decoding filter is $$\sum_{n=1}^{N} a_n e^{+i\omega\tau_n} \quad (10)$$

The desired filter f(t) should thus be identified with the process $$f(t) = \sum_{n=1}^{N} \int a_n e^{i\omega\tau_n} e^{i\omega t} d\omega = \sum_{n=1}^{N} a_n \delta(t + \tau_n) \quad (11)$$

Let us now evaluate the transfer function from 42 to 31 of the same system depicted in FIG. 1. This is obtained in the time domain by evaluating the response at 31 due to a pulse input at terminal 42. One now gets at 31:

$$i(t) = \sum_{m=1}^{N} d_m \delta(t - \tau_m) \quad (12)$$

where $$d_m = \left\{ \prod_{k=1}^{m-1} \beta_k \right\} \alpha_m \left\{ \prod_{m}^{N-1} \beta_k \right\} = \frac{\alpha_m}{\beta_m} \left\{ \prod_{k=1}^{N} \beta_k \right\} = a_m \quad (13)$$

$$\tau_m = \frac{1}{v} \left\{ \sum_{p=1}^{m-1} L_{2p} + \sum_{q=m}^{N-1} L_{1q} \right\} \quad (14)$$

One can easily observe that $\bar{\tau}_m$ is a complementary function to $\tau_m$ since the order of the delay lines is inversed; the first $(m-1)$ delays originate from lower line 40 and the last $(N-m)$ ones are from upper line 20. Thus by simple mathematical manipulation $$\bar{\tau}_m = \frac{1}{v} \left\{ \left[ \sum_{p=1}^{N-1} L_{2p} - \sum_{p=m}^{N-1} L_{2p} \right] + \left[ \sum_{q=1}^{N-1} L_{1q} - \sum_{q=1}^{m-1} L_{1q} \right] \right\} =$$

$$\tau_{1T} + \tau_{2T} - \frac{1}{v} \left\{ \sum_{q=1}^{m-1} L_{1q} + \sum_{p=m}^{N-1} L_{2p} \right\} =$$

$$[\tau_{1T} + \tau_{2T}] - \tau_m = T - \tau_m \quad (15)$$

Where T is the sum of the total delays of the two lines.

Substituting Eqs. (13) and (15) into Eq. (12) one gets at 31:

$$i(t) = \sum_{m=1}^{N} a_m \delta(t - T + \tau_m) \quad (16)$$

which is of identical form to that required by Eq. (11) except for a constant time delay T.

This derivation thus indicates that a signal transmitted at 22 depicted by arrow 11 and encoded by the coupled multimode fiber delay lines at the 51 shown by arrow 59, can be retrieved if being fed at 42 shown by arrow 101 for final decoding at 31 shown by arrow 109. Thus the output signal detected at 31 after transmitting a signal from 22 to 51 and then again from 42 to 31 is expressed by $$i(t) = \sum_{n=1}^{N} \sum_{m=1}^{N} a_n a_m \, \delta(t-\tau_n) \circledast \delta(t-T+\tau_m) = \quad (17)$$

$$= \sum_{n=1}^{N} \sum_{m=1}^{N} a_n a_m (t-T+\tau_m-\tau_n)$$

$$= \sum_{n=1}^{N} a_n^2 \delta(t-T) + \sum_{\substack{n=1 \\ n \neq m}}^{N} \sum_{m=1}^{N} a_n a_m \, \delta(t-T+\tau_m-\tau_n)$$

The N terms corresponding to n=m occurring simultaneously at t=T form the autocorrelation part, while all other (N²−N) terms are distributed over the interval 2T, providing the cross-correlation background. The choice of the delay line lengths $\{L_n\}$ establishes the distribution of the cross-correlation terms.

Assume a coupler with a fractional power transmission of $\alpha_n$ and a coupling of $\beta_n$ (FIG. 3) is defined by $$\frac{P_B}{P_A} = \frac{P_D}{P_C} = \beta_n \quad (18)$$

$$\frac{P_D}{P_A} = \frac{P_B}{P_C} = \alpha_n \quad (19)$$

It was shown in Eq. (7) that the signal intensity fraction of a pulse transferring from line to line at the $n^{th}$ coupler is $$a_n = \left(\frac{P_4}{P_1}\right)_n = \left(\frac{P_3}{P_2}\right)_n = \alpha_n \sum_{\substack{k=1 \\ k \neq n}}^{N} \beta_k = \frac{\alpha_n}{\beta_n} \prod_{k=1}^{N} \beta_k \quad (20)$$

Assuming all couplers have identical transfer coefficients (i.e., $\alpha_n = \alpha$, $\beta_n = \beta$ for any n) we find $$a_n = \alpha \beta^{N-1}$$

Since some insertion loss, $\gamma$, is inevitable in any coupler, one has $$\alpha + \beta = 1 - \gamma = r$$

so that $$a_n = \alpha(r-\alpha)^{N-1} \quad (21)$$

This quantity is maximized for $\alpha = r/N$, leading to a maximal $a_n$ value of $$a_n = \frac{r^N}{N}\left(1 - \frac{1}{N}\right)^{N-1} = \frac{r^N}{N-1}\left(1 - \frac{1}{N}\right)^N \quad (22)$$

It is interesting to point out that for a large number of couplers, N, one has $$\lim_{N \to \infty} \left(1 - \frac{1}{N}\right)^N = \frac{1}{e}$$

and thus the maximal value of the coupled signal intensity is $$a_n = \frac{r^N}{(N-1)e} \quad (23)$$

We did not consider signals that are transferred an odd number of times between the two lines within one path. An odd number of transitions will be necessary for coupling from one line to another. Indeed, such transitions will be attenuated by a factor of $$a_n^{(p)} = \alpha^p \beta^{N-p} \quad p = 3, 5, \ldots$$

which for the optimal case just evaluated means an additional attenuation of $$\left(\frac{\alpha}{\beta}\right)^{p-1} = \frac{1}{(N-1)^{p-1}}$$

However since the system considered here is linear, these additional terms resulting from an odd number of transfers will improve the signal to noise characteristics of the system; the autocorrelation term remains at t=T and the cross correlation terms are distributed along the 0<t<2T interval.

The decoded autocorrelation is composed of N superposed signals of equal intensity $a_n^2$, thus providing an intensity peak of $$(P_4)_{t=T} = N a_n^2 = \frac{N}{(N-1)^2} r^{2N} \left(1 - \frac{1}{N}\right)^{2N} \xrightarrow[N \to \infty]{} \frac{r^{2N}}{Ne^2} \quad (24)$$

On the other hand the cross-correlation intensity is composed of (N²−N) signals spread along the time scale. If no cross-correlation terms occur within a same time interval, the average background signal level is $a^2_n$. The peak background signal is a function of the randomness of the distribution of the delay lines $\{L_n\}$. The probability of synchronous cross-correlation terms (various combinations of m and n for which $\tau_m - \tau_n$ is a constant) can be decreased if the spread of $\{L_n\}$ is sufficiently wide.

$$\tau_m - \tau_n =$$

$$\frac{1}{v}\left\{\left[\sum_{q=1}^{m-1} L_{1q} - \sum_{q=1}^{n-1} L_{1q}\right] + \left[\sum_{p=m}^{N-1} L_{2p} - \sum_{p=n}^{N-1} L_{2p}\right]\right\} =$$

$$\frac{1}{v}\left[\sum_{q=n}^{m-1} L_{1q} - \sum_{p=n}^{m-1} L_{2p}\right] = \frac{1}{v} \sum_{p=n}^{m-1} (L_{1p} - L_{2p})$$

The net delay per segment is $$\tilde{L}_p = L_{1p} - L_{2p}$$

so that $$\tau_m - \tau_n = \frac{1}{v} \sum_{p=n}^{m-1} \tilde{L}_p \quad (25)$$

Let the delay line segment differences form an arithmetic series with some random perturbation:

$$\tilde{L}_p = \tilde{L}_o + (p-1)\tilde{\Delta L} + r_L$$

where $\tilde{\Delta L}$ is an equal increment per segment and $r_L$ a random variable accounting for manufacturing inaccuracies in the delay length determination. Assume this random variable to be smaller than the increment size $$|r_L| < r\widetilde{\Delta L},$$

the distribution of the proportionality constant being $$p(r) = \frac{1}{2r_{max}} \text{ for } |r| < r_{max},$$
$$0$$

elsewhere Eq. (25) now becomes $$\tau_m - \tau_n = \sum_{p=n}^{m-1} [\widetilde{L}_0 + (p - 1 + r) \widetilde{\Delta L}]. \tag{26}$$

Upon the evaluation of the summation, one finds $$<\tau_m - \tau_n> = (m - n) [\widetilde{L}_0 + \frac{m+n-3}{2} \widetilde{\Delta L}] \tag{27}$$

Equation (27) reveals by inspection that if no length increment $\widetilde{\Delta L}$ would be added between consecutive delay lines, then same $\tau_m - \tau_n = (m-n)\widetilde{L}_o$ will be exhibited by $N-(m-n)$ pulses, thus making the signal extraction impossible since this cross-correlation would be of triangular shape. Upon allowing $\widetilde{\Delta L} \neq 0$, the cross correlation is spread over a much larger time domain, but different contributions will not superpose unless Eq. (27) describes components within one resolution element.

For instance, the highest cross correlation term occurs near the autocorrelation peak. Thus the expected value of $\tau_m - \tau_n$ for $m=n+1$ is equal to $\widetilde{L}_o + (n-1)\widetilde{\Delta L}$, from which we deduce that L should be of significant length (i.e., $\widetilde{\Delta L}/\widetilde{L}_o = 0.1 - 0.4$) if we want to avoid the $(N-1)$ components bunching out near the autocorrelation peak.

A computer program written in FORTRAN IV language, hereinbelow as an Appendix, simulating the system described, has been generated to analyze the system's behavior. The delay lines were chosen to form a linear progression with increments of 0.25 L, where L is the minimum delay, with an additional random variation limited by ±0.5 L. The excess loss of the couplers takes random values with a mean of −0.25 db, and the coupling efficiency was allowed to vary from the optimal value of r/N by ±15%. The detector was assumed to have a resolution of 1/10L. Thus receivers with a minimum bandwidth of 15 MHz will be necessary to detect the autocorrelation peak if the initial pulse was 20 nsec wide, and the shortest delay line (L) provides a delay of 200 nsec, corresponding to a line length of 40 m.

Figure 5:
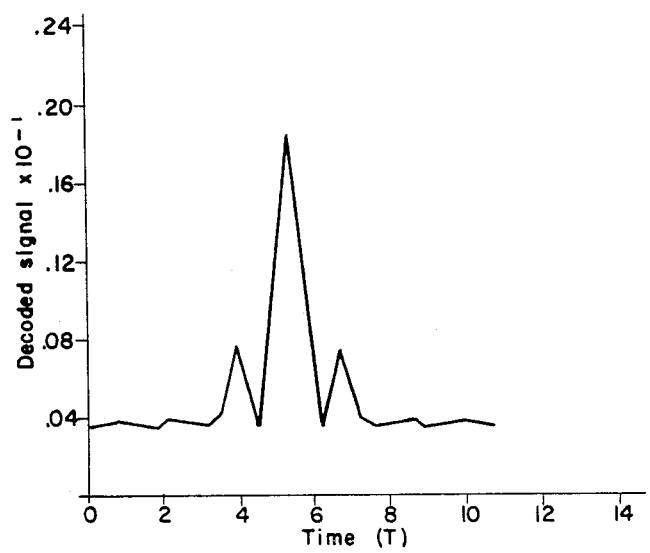
Figure 6:
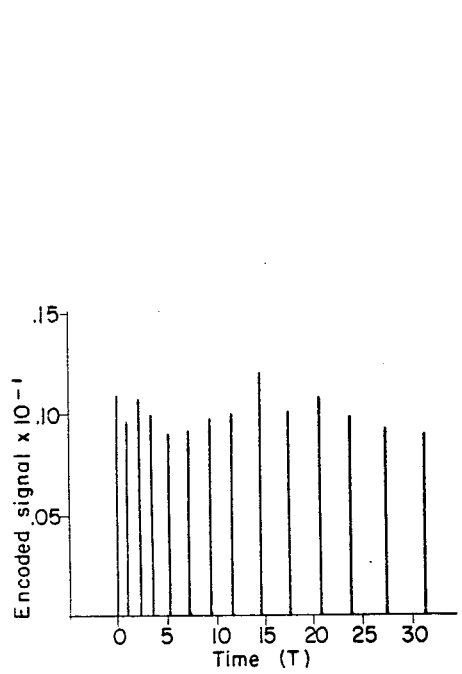
Figure 7:
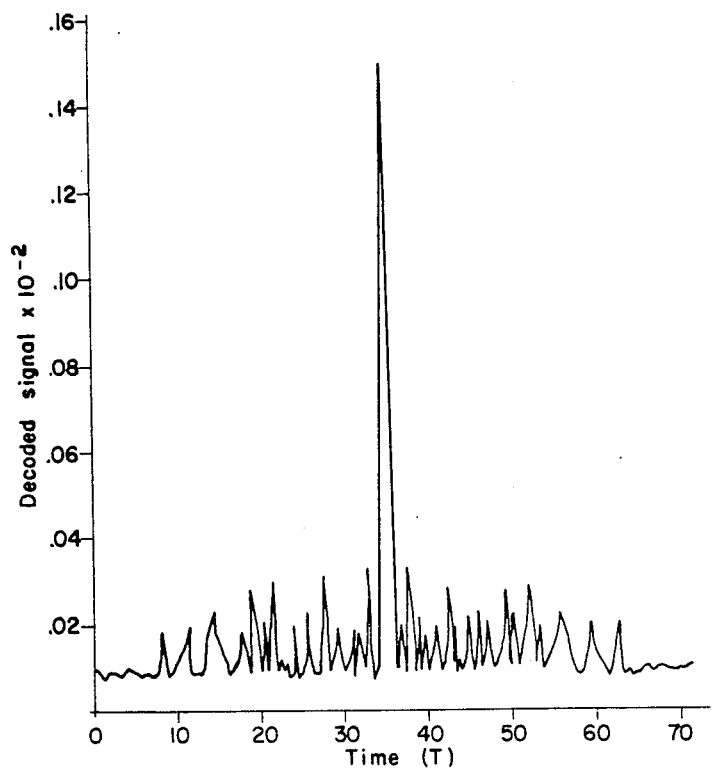

Referring to FIGS. 4 through 7, the decoded output results from the encoding and decoding operation. FIGS. 4 and 5 represent the result obtained with a system composed of 5 couplers (4 delay lines) as shown in FIG. 1, while FIGS. 6 and 7 represent a system with 15 couplers (14 delay lines not shown). The lower delay line as at 40 was assumed to have negligible delay ($L_{2M}=0$). The abscissa is normalized in terms of the delay of the shortest delay line (thus $t=L/V=1$). The autocorrelation peak thus occurs for the time corresponding to the total delay of the upper line 20, which for the 4 delay lines as in FIG. 5 is at $T=4(1+3/2\times 0.25)=5.5$, while for the 14 delay lines (not shown) according to results illustrated in FIG. 7 occurs at $T=14(1+13/2\times 0.25)=36.75$. The encoded signal is shown in FIGS. 4 and 6 for the two situations discussed.

Optical fibers could be utilized in a straightforward manner for performing intensity correlations needed to process encoded information. The serial coding techniques are advantageous due to the self realization of the matched filter necessary for the correlation display.

Mechanization

Referring to FIGS. 1-3, the delay line encoder-decoder system utilizing multimode optical fibers serially interconnected and optically coupled to another similar structure, is the basis of the invention.

A light source 10, which may be a laser or other light generating means, provides an output at 11 into main delay structure 20. Structure 20 comprises supporting substrate 21 upon which is wound optical fiber coils 25, 27, 29 and 33. Sections 24, 26, 28, 30 and 32 respectively connecting the aforementioned coils, one section between two ends, serve as coupling regions to be hereinafter discussed. Fiber element 22 is used as means for optically connecting the output at 11 of light source 10 to the first coupling region 24. Fiber element 31 is used as means for optically connecting coupling region 32 at 109 to transducer 110.

A typically received radiated wave such as an optical beam, acoustical wave, microwave or radio frequency energy, is detected by sensor 90 which converts such wave into a signal at 91 which signal 91 activates light source 100. Light source 100 emanates a light beam at 101 providing an input to bus line structure 40 which has optical fiber coils 43, 47, 49 and 53. Sections 44, 46, 48, 50 and 52 respectively connecting the aforementioned coils, one section per coil end, serve as coupling regions respectively to coupling regions 24, 26, 28, 30 and 32 of structure 20. Fiber element 42 is used as means for optically connecting the output at 101 of light source 100 to the first coupling region 44. Fiber element 51 is used as means for optically connecting coupling region 52 at 59 to power amplifier 60.

Although structure 40 has been shown with multiple coils having a plurality of delay periods, it is pointed out that even a single or no delay period is necessary to be provided in this structure. Thus no coils would be present in the no delay period case between coupling regions 44, 46, 48, 50 and 52.

Alternately, output signal at 59 may be provided to connect fiber element 51 to light detector 70 the electrical output of which is connected to amplifier 80.

Amplifiers 60 or 80 may be used, for example, for making connections to an electromagnetic wave transmitter for communication of encoded signals.

The transmitted signals by way of apparatuses 60 or 80 may be reversed in the structure of FIGS. 1 or 2, for decoding and retrieving information from the encoded signals as above described. A specific set of coupling regions 26 extending from A to B of structure 20, optically couples energy into the corresponding region 46 extending from C to D of structure 40, and vice-versa from region 46 to region 26. It can be seen that regions 26 and 40 have a common cladding 57 for fiber portions A-B and C-D, which is one method of optical coupling, out of many methods possible.

The unusual results obtained have already been hereinabove discussed in conjunction with FIGS. 4-7.

The FIGS. 1-3 structure above-described, permits optical criss-crossing of energy between structures 20 and 40 at the coupling regions hereinabove discussed.

Such criss-crossing allows the utilization of the structure for both encoding and decoding purposes without any need for adjustments and calibrations of the dimension of the optical elements or fibers used.

Thus a signal at 11 is being encoded by structures 20 and 40, such signal exiting at 59 in encoded form, the results being shown in FIGS. 4 and 6. Such signals when fed at 101 will be also be decoded by structures 40 and 20 so that the decoded signals are available at 109 for input to transducer or detector 110.

Of course it is obvious that transducer 110 may be connected to structure 40 at 42 and the serial combination of sensor 90 and source 100 connected to structure 20 at 31.

It is also obvious that structures 20 and 40 are interchangeable with reference to connection of their respective sources and loads.

What is claimed is:

1. A delay line encoder-decoder, comprising the combination:
   a first optical structure having at least two optical fiber coils integral therewith and having a coupling region between each of said at least two coils, each of said regions being at least one first coupling section; and
   a second optical structure having an optical fiber integral therewith, said optical fiber having a corresponding second section optically coupled to each said at least one first coupling section and contiguous thereto.

2. The invention as stated in claim 1:
   said optical fiber including at least one coil between any adjacent two of said second sections.

3. The invention as stated in claim 1, including a light source optically coupled to a first of said at least two optical fiber coils.

4. The invention as stated in claim 1, including a light source optically coupled to an input end of the optical fiber.

5. The invention as stated in claim 4, including a sensor electrically connected to the input of the light source.

6. The invention as stated in claim 1, including a transducer optically coupled to a last of said at least one first coupling section.

7. The invention as stated in claim 1, including an amplifier optically coupled to the last of said corresponding coupling sections.

8. The invention as stated in claim 1, including a light source optically coupled to the first means for providing light input to said first means.

9. The invention as stated in claim 1, including a transducer optically coupled to the last of the first plurality of sections for converting optical energy into electrical energy.

10. The invention as stated in claim 1, including an amplifier optically coupled to the last of the second plurality of coupling sections for amplifying the optical energy.

11. The invention as stated in claim 1, including a light detector optically coupled to the last of said corresponding second section.

12. The invention as stated in claim 11, including an amplifier electrically connected to the output of the light detector.

13. The invention as stated in claim 1, including a light source optically coupled to the second means for providing light input to said second means.

14. The invention stated in claim 13, including a sensor electrically connected to the input of the light source for providing electrical signal input to said light source.

15. The invention as stated in claim 1, including a light detector optically coupled to the last of the second plurality of coupling sections for demodulating optical carrier signals and passing intelligence signals.

16. The invention as stated in claim 15, including an amplifier electrically connected to the output of the light detector for amplifying said electrical signals.

17. An optical delay method for encoding and decoding electromagnetic energy, comprising in combination the steps of:
   (a) injection light energy into a first optical delay line;
   (b) transferring said light energy to a second optical delay line;
   (c) passing the transferred light energy into a first load thereby encoding said light energy;
   (d) passing the light energy from the first optical delay line into a second load subsequent to step (a) and concurrent with steps (b) and (c);
   (e) injecting the encoded light energy into the second optical delay line;
   (f) transferring the encoded light energy from the second optical delay line to the first optical delay line; and
   (g) passing the transferred energy into the second load, as identified in step (d), thereby decoding said light energy.

* * * * *